United States Patent [19]
Tsukamoto et al.

[11] Patent Number: 6,048,627
[45] Date of Patent: Apr. 11, 2000

[54] BIAXIALLY ORIENTED POLYETHYLENE NAPHTHALATE COPOLYMER FILM

[75] Inventors: Ryoji Tsukamoto; Mitsuru Teramoto; Seiji Ito; Masahiko Kosuge, all of Matsuyama, Japan

[73] Assignee: Teijin Limited, Osaka, Japan

[21] Appl. No.: 09/214,435

[22] PCT Filed: May 1, 1998

[86] PCT No.: PCT/JP98/02002

§ 371 Date: Jan. 5, 1999

§ 102(e) Date: Jan. 5, 1999

[87] PCT Pub. No.: WO98/50456

PCT Pub. Date: Nov. 12, 1998

[30] Foreign Application Priority Data

| May 6, 1997 | [JP] | Japan | 9-115572 |
| Jun. 30, 1997 | [JP] | Japan | 9-173799 |
| Aug. 28, 1997 | [JP] | Japan | 9-232431 |

[51] Int. Cl.$^7$ .............................. G03C 3/02; C08G 63/02
[52] U.S. Cl. ..................... 428/501; 528/272; 528/298; 528/302; 528/308; 428/31; 428/908
[58] Field of Search ................... 528/272, 298, 528/302, 308; 430/31, 501, 908

[56] References Cited

U.S. PATENT DOCUMENTS 5,102,705  4/1992  Yamamoto et al. ................. 428/36.92

FOREIGN PATENT DOCUMENTS

| 48-40414 | 11/1973 | Japan . |
| 50-109715 | 8/1975 | Japan . |
| 53-146773 | 12/1978 | Japan . |
| 1-244446 | 9/1989 | Japan . |
| 6-258768 | 9/1994 | Japan . |
| 7-72584 | 3/1995 | Japan . |
| 8-104742 | 4/1996 | Japan . |
| 8-92390 | 4/1996 | Japan . |
| 8-134194 | 5/1996 | Japan . |

*Primary Examiner*—Samuel A. Acquah
*Attorney, Agent, or Firm*—Sughrue, Mion, Zinn, Macpeak & Seas, PLLC

[57] ABSTRACT

A biaxially oriented film which is made substantially of (1) a polyethylene naphthalate copolymer comprising an ethylene naphthalate unit in an amount of 92 to 99.5 mol % based on all recurring units and at least one copolymer component selected from the group consisting of (a) a glycol having a fluorene skeleton in the molecule, (b) p-hydroxymethylbenzoic acid, (c) p-hydroxyethoxybenzoic acid and (d) p-hydroxyethoxyethoxybenzoic acid in an amount of 0.5 to 8 mol % based on the total of all dicarboxylic acid components, and which has (2) Young's moduli in both longitudinal and transverse directions of 500 kg/mm$^2$ or more and (3) a delamination resistance of 10% or less in terms of fold line whitening ratio. Since this biaxially oriented film of the present invention is excellent in delamination resistance, curling resistance, mechanical strength, color and transparency, it is of great value as a base film for a photo film.

12 Claims, No Drawings

BIAXIALLY ORIENTED POLYETHYLENE NAPHTHALATE COPOLYMER FILM

TECHNICAL FIELD

The present invention relates to a biaxially oriented film made of a polyethylene naphthalate copolymer. More specifically, it relates to a biaxially oriented film made of a polyethylene naphthalate copolymer and having excellent delamination resistance, curling resistance, mechanical strength, color and transparency. The biaxially oriented film of the present invention is advantageously used as a base film for a photo film.

BACKGROUND ART

A triacetate film has been used as a base material for a photo film. This triacetate film involves safety and environmental problems because an organic solvent is used in the production process of the film. It also has such a defect that it has limits in its mechanical strength and dimensional stability. Therefore, a polyethylene terephthalate film has started to be used as a substitute material in some industries. However, when it is stored in a rolled state, its curling remains persistently and it is difficult to remove it. Therefore, such a film is inferior in its handling properties after development, thereby making it difficult to use it as a photo film which is used as a roll film.

As a technology for improving curling resistance, JP-A 53-146773, JP-A 1-244446 and the like propose modified polyethylene terephthalate films having improved water-vapor permeation, improved moisture content and the like. Although the effect of suppressing curling is recognized in these films, they have such defects as a reduction in dimensional stability caused by moisture absorption, an increase in the deformation of an edge portion of a film caused by a fall in glass transition temperature and the like. Therefore, these films are unsatisfactory as a photo film.

Further, in recent years, photo films of higher quality have been demanded along with an increase in the winding speed of a film at the time of shooting and a reduction in the size of a photographing device (camera), in the case of a roll film. It has been desired that the film show excellent curling resistance even when rolled to a small diameter and that it have high mechanical strength and dimensional stability even when reduced in thickness. These requirements can be satisfied by neither the conventional triacetate film nor the above modified polyethylene terephthalate films. Therefore, a photo film having excellent properties has been demanded.

To meet these demands, the application of a polyethylene naphthalate (PEN) film to a photo film is proposed by JP-B 48-40414, JP-A 50-109715 and the like. Since the films disclosed by the above publications have high mechanical strength and dimensional stability, they show excellent adaptability to a reduction in thickness and are satisfactory to some extent in terms of curling resistance when rolled to a small diameter. However, they involves another problem that delamination (interlaminar peeling) easily occurs in the films, particularly when the film is perforated in the production of a roll film. In this case, they have a problem with their use as a base film for a photo film because a delaminated portion is whitened.

JP-A 8-104742 discloses a modified polyester having a glass transition temperature (Tg) higher than polyethylene naphthalate (PEN) and a film thereof. It also teaches that the modified polyester film is used for photographic application. In this proposal, modified PEN comprising, as a copolymer component, an ester-forming derivative having a fluorene group, phenylindane group, spiroglycol group or diphenylsulfone group is given as the modified polyester having a higher Tg than PEN. Specific examples disclosed in the above publication show that modified PEN comprising, as a copolymer component, at least 17 mol % of a diol containing a fluorene group (Example 6) has a Tg of 126° C. and that modified PEN comprising, as a copolymer component, 11 mol % of this diol (Comparative Example 6) has a low Tg and a film made of the modified PEN has low curling resistance.

The invention disclosed in the above publication is intended to obtain a modified polyester having Tg higher than that (Tg=122° C.) of PEN. Therefore, when the copolymer component is a diol containing a fluorene group, it is used in an amount of 17 mol % or more. A film made of this modified polyester is unsatisfactory in terms of Young's moduli and causes troubles in the handling and other treatments of the film.

Problems that the Invention Intends to Solve

It is an object of the present invention to provide a base film suitable for use in a photo film and having its excellent delamination resistance, curling resistance, mechanical strength, color and transparency.

According to the studies conducted by the inventors of the present invention, it has been found that the above object of the present invention can be attained by a biaxially oriented film made of a polyethylene naphthalate copolymer obtained by copolymerizing specific copolymer components in a specific ratio.

Means for Solving the Problems

According to the present invention, there is provided a biaxially oriented film which is made substantially of (1) a polyethylene naphthalate copolymer comprising an ethylene naphthalate unit in an amount of 92 to 99.5 mol % based on all recurring units and at least one copolymer component selected from the group consisting of (a) a glycol having a fluorene skeleton in the molecule, (b) p-hydroxymethylbenzoic acid, (c) p-hydroxyethoxybenzoic acid and (d) p-hydroxyethoxyethoxybenzoic acid in an amount of 0.5 to 8 mol % based on the total of all dicarboxylic acid components, and which has (2) Young's moduli in both longitudinal and transverse directions of 500 kg/mm² or more and (3) a delamination resistance of 10% or less in terms of fold line whitening ratio.

The constitution and production process of the polyethylene naphthalate copolymer forming the biaxially oriented film of the present invention will be described hereinafter, followed by the description of the constitution and production process of a film made of the copolymer.

In the present invention, the main dicarboxylic acid component forming the polyethylene naphthalate copolymer is naphthalenedicarboxylic acid and the main glycol component is ethylene glycol.

In this specification, the "main" dicarboxylic acid component means that the dicarboxylic acid component is contained in an amount of 92 mol % or more, preferably 95 mol % or more based on the total of all dicarboxylic acid components and the "main" glycol component means that the glycol component is contained in an amount of 92 mol % or more, preferably 95 mol % or more based on the total of all glycol components.

Illustrative examples of the naphthalenedicarboxylic acid include 2,6-naphthalenedicarboxylic acid, 2,7- naphthalenedicarboxylic acid, 1,5-naphthalenedicarboxylic acid and the like. Of these, 2,6-naphthalenedicarboxylic acid is preferred.

The polyethylene naphthalate copolymer of the present invention contains at least one component selected from the group consisting of the following components "a" to "d", as a copolymer component, in an amount of 0.5 to 8 mol % based on the total of all dicarboxylic acid components.

(i) a glycol having a fluorene skeleton in the molecule (component "a")

(ii) p-hydroxymethylbenzoic acid (component "b")

(iii) p-hydroxyethoxybenzoic acid (component "c")

(iv) p-hydroxyethoxyethoxybenzoic acid (component "d")

These components "a" to "d" are a glycol or hydroxycarboxylic acid and may be an ester-forming functional derivative thereof as a raw material for obtaining the copolymer. For example, the hydroxyl group may be esterified by a lower monocarboxylic acid, or the carboxyl group may be esterified by a lower monoalcohol.

A description is subsequently given of each of these components.

The component "a" as a copolymer component is a glycol having a fluorene skeleton in the molecule, as exemplified by 9,9-bis[4-(2-hydroxyethoxy)phenyl]fluorene. When the glycol as the component "a" has an aromatic group in the molecule, the aromatic group may have 1 to 4 inert substituents such as halogen, a nitro group, a lower alkyl group having 1 to 4 carbon atoms or a lower alkoxy group having 1 to 3 carbon atoms. This component "a" is used in an amount of 0.5 to 8 mol %, preferably 0.5 to 5 mol % based on the total of all dicarboxylic acid components.

When the amount of the component "a" is smaller than 0.5 mol %, the delamination resistance of the obtained film does not improve, while when the amount is larger than 8 mol %, the crystallinity of the film is impaired and the mechanical strength and curling resistance of the film also degrade.

The component "b" as a copolymer component is p-hydroxymethylbenzoic acid. Stated more specifically, esters of lower alkyl such as methyl, ethyl, propyl and butyl of p-hydroxymethylbenzoic acid may be used in addition to p-hydroxymethylbenzoic acid. These p-hydroxymethylbenzoic acid and lower alkyl esters thereof may have 1 to 4 inert substituents such as halogen, a nitro group, a lower alkyl group having 1 to 4 carbon atoms or a lower alkoxy group having 1 to 3 carbon atoms at the benzene nucleus. The component "b" is used in an amount of 0.5 to 8 mol %, preferably 1 to 8 mol %, particularly preferably 3 to 7 mol % based on the total of all dicarboxylic acid components. When the amount of the component "b" is smaller than 0.5 mol %, the delamination resistance of the obtained film does not improve, while when the amount is larger than 8 mol %, the crystallinity of the film is impaired and the mechanical strength and curling resistance of the film also degrade.

The component "c" as a copolymer component is p-hydroxyethoxybenzoic acid. Stated more specifically, esters of lower alkyl such as methyl, ethyl, propyl and butyl of p-hydroxyethoxybenzoic acid may be used in addition to p-hydroxyethoxybenzoic acid. These p-hydroxyethoxybenzoic acid and lower alkyl esters thereof may have 1 to 4 inert substituents such as halogen, a nitro group, a lower alkyl group having 1 to 4 carbon atoms or a lower alkoxy group having 1 to 3 carbon atoms at the benzene nucleus. The component "c" is used in an amount of 0.5 to 8 mol %, preferably 1 to 8 mol %, particularly preferably 3 to 7 mol % based on the total of all dicarboxylic acid components. When the amount of the copolymer component "c" is smaller than 0.5 mol %, the delamination resistance of the obtained film does not improve, while when the amount is larger than 8 mol %, the crystallinity of the film is impaired and the mechanical strength and curling resistance of the film also degrade.

The component "d" as a copolymer component is p-hydroxyethoxyethoxybenzoic acid. Stated more specifically, the same esters of lower alkyl as those listed for the component "c" may be used in addition to p-hydroxyethoxyethoxybenzoic acid. Preferred examples of the component "d" include p-hydroxyethoxyethoxybenzoic acid and methyl p-hydroxyethoxyethoxybenzoate. These p-hydroxyethoxyethoxybenzoic acid and lower alkyl esters thereof may have 1 to 4 inert substituents such as halogen, a nitro group, a lower alkyl group having 1 to 4 carbon atoms or a lower alkoxy group having 1 to 3 carbon atoms at the benzene nucleus. Of these, for example, methyl p-hydroxyethoxyethoxybenzoate can be synthesized in accordance with Liq. Cryst. (1995), 18(2), 291–301.

The component "d" is used in an amount of 0.5 to 8 mol % based on the total of all dicarboxylic acid components. When the amount of the copolymer component "d" is smaller than 0.5 mol %, the delamination resistance of the obtained film does not improve, while when the amount is larger than 8 mol %, the crystallinity of the film is impaired and the mechanical strength and curling resistance of the film also degrade. The amount of the component "d" is preferably 1 to 8 mol %, more preferably 3 to 7 mol %.

In the polyethylene naphthalate copolymer of the present invention, the components "a" to "d" are used as the copolymer component and may be used alone or in combination.

The polyethylene naphthalate copolymer of the present invention must contain the components "a" to "d", as copolymer components, as described above, and as a more preferable embodiment, it is a copolymer containing a diethylene glycol component in an amount of not more than 3 mol % based on the total of all dicarboxylic acid components. The content of the diethylene glycol component is measured in accordance with a method which will be described later.

When the amount of the diethylene glycol component is larger than 3 mol %, the delamination resistance of the obtained film greatly improves but the crystallinity is impaired, whereby mechanical strength greatly degrades disadvantageously.

The diethylene glycol component is by-produced in the production process of the polyethylene naphthalate copolymer and copolymerized. A polymerization method and conditions which ensure that the amount of this copolymer component does not exceed 3 mol % should be selected. The smaller the amount of the diethylene glycol component to be copolymerized is the more preferred it is. It is preferably 2.5 mol % or less, particularly preferably 2 mol % or less.

The polyethylene naphthalate copolymer in the present invention may contain other dicarboxylic acid component in such an amount that does not impair the effect of the present invention, for example, 10 mol % or less, preferably 5 mol % or less, based on the total of all dicarboxylic acid components. Illustrative examples of such other dicarboxylic acid components include aromatic dicarboxylic acids such as terephthalic acid, isophthalic acid, phthalic acid, diphenyl dicarboxylic acid, diphenyl ether dicarboxylic acid, diphenyl sulfone dicarboxylic acid, benzophenonedicarboxylic acid, phenylindanedicarboxylic acid, 5-sulfoxyisophthalic acid metal salt and 5-sulfoxyisophthalic acid phosphonium salt; aliphatic dicarboxylic acids such as oxalic acid, succinic acid, adipic acid, sebacic acid and cyclohexanedicarboxylic acid; and the like. They may be used alone or in combination of two or more.

The polyethylene naphthalate copolymer in the present invention may contain other glycol component in such an amount that does not impair the effect of the present invention, for example, 10 mol % or less, preferably 5 mol % or less, based on the total of all glycol components. Illustrative examples of such other glycol components include aliphatic glycols such as propylene glycol, tetramethylene glycol, pentamethylene glycol, hexamethylene glycol, octamethylene glycol, decamethylene glycol, neopentylene glycol, polyethylene glycol, cyclohexanediol and cyclohexanedimethanol; aromatic glycols such as o,m,p-xylylene glycol, 1,4-bis(2-hydroxyethoxy)benzene, 1,4-bis(2-hydroxyethoxyethoxy)benzene, 4,4'-bis(2-hydroxyethoxy)biphenyl, 4,4-bis(2-hydroxyethoxyethoxy)biphenyl, 2,2-bis[4-(2-hydroxyethoxy)phenyl]propane, 2,2-bis[4-(2-hydroxyethoxyethoxy)phenyl]propane, 1,3-bis(2-hydroxyethoxy)benzene, 1,3-bis(2-hydroxyethoxyethoxy)benzene, 1,2-bis(2-hydroxyethoxy)benzene, 1,2-bis(2-hydroxyethoxyethoxy)benzene, 4,4-bis( 2-hydroxyethoxy) diphenylsulfone and 4,4-bis(2-hydroxyethoxyethoxy) diphenylsulfone; diphenols such as hydroquinone, 2,2-bis(4-hydroxyphenyl)propane, resorcin, catechol, dihydroxynaphthalene, dihydroxybiphenyl and dihydroxy-diphenyl sulfone; and the like. They may be used alone or in combination of two or more.

The polyethylene naphthalate copolymer in the present invention is substantially linear and may be copolymerized with a polycarboxylic acid having 3 or more functional groups or polyhydroxy compound, such as trimellitic acid or pentaerythritol, in such amount that do not impair the effect of the present invention, for example, 2 mol % or less, preferably 1 mol % or less, based on the total of all dicarboxylic acid components.

The polyethylene naphthalate copolymer in the present invention can be produced by polycondensing a dicarboxylic acid component including the above naphthalene dicarboxylic acid or lower alkyl ester thereof as a main component, ethylene glycol and a copolymer component(s) "a" to "d" in a predetermined ratio. Preferably, the polyethylene naphthalate copolymer is produced by polycondensing a reaction product obtained through an ester interchange reaction among dicarboxylic acid components including a lower alkyl ester of naphthalenedicarboxylic acid as a main component, ethylene glycol and the copolymer component (s). When a film is formed of the polyethylene naphthalate copolymer produced by this method, the film is satisfactory in terms of color and transparency.

Illustrative examples of the lower alkyl ester of naphthalenedicarboxylic acid include dimethyl ester, diethyl ester and dipropyl ester of naphthalenedicarboxylic acid. Of these, dimethyl ester of naphthalenedicarboxylic acid is preferred.

The polyethylene naphthalate copolymer in the present invention may also contain additives such as a lubricant, pigment, dye, antioxidant, light stabilizer, screening agent and the like as required, in such amounts that do not impair the transparency, surface flatness and heat stability of a film.

It is preferred to provide slipperiness to the biaxially oriented film of the present invention according to its use. There may be used methods known per se as those for providing slipperiness. For example, there are preferably used a method for dispersing lubricant particles in a polymer, a method for forming a slippery layer on the surface of a film, and the like.

To disperse lubricant particles in a polymer, there may be used a method in which at least one member of $SiO_2$, $BaSO_4$, $CaCO_3$, aluminosilicate and cross-linked organic particles may be added to a polymer or a method in which the residue of a catalyst or the like may be precipitated out during the polymerization of a polyethylene naphthalate copolymer.

A preferred method for dispersing lubricant particles in a polymer comprises adding lubricant particles to the polymer. According to this method, the effect of providing slipperiness is remarkable. In this method, it is particularly preferred that lubricant particles having a refractive index close to that of a polyethylene naphthalate copolymer, such as $BaSO_4$, aluminosilicate or cross-linked organic particles (such as cross-linked polystyrene) are added. According to this method, slipperiness can be provided effectively and the transparency of a film can be kept high.

A preferred method for forming a slippery layer on the surface of a film comprises forming a thin layer containing lubricant particles on at least one side of a polyethylene naphthalate copolymer film containing substantially no lubricant particles. According to this method, a film having high slipperiness and high transparency can be obtained. In this method, it is preferred to laminate these layers by co-extrusion using a plurality of extruders, a feedblock and multi-manifold in combination.

To produce the biaxially oriented film of the present invention, there can be employed methods that are conventionally known per se. For example, the biaxially oriented film can be produced by a method comprising melting a polyethylene naphthalate copolymer, extruding it into a sheet, cooling the sheet on a cooling drum to give an unstretched film, stretching the unstretched film in biaxial directions, heat setting it, and thermally relaxing it as required. Since the surface properties, density and thermal shrinkage of the film change according to stretching conditions and other production conditions, proper conditions are selected according to the requirement to form a film.

In the above film formation method, it is preferred that an unstretched film, prepared by extruding the polyethylene naphthalate copolymer that has been molten at a temperature of [Tm+10° C.] to [Tm+30° C.] (Tm is the melting point of the polyethylene naphthalate copolymer), is stretched to 2 to 5 times in a monoaxial direction (longitudinal or transverse direction) at a temperature of [Tg−10° C.] to [Tg+50° C.] (Tg is the glass transition temperature of the polyethylene naphthalate copolymer) and to 2 to 5 times in a direction perpendicular to the above stretching direction (transverse direction when the film is first stretched in a longitudinal direction) at a temperature of [Tg] to [Tg+50° C.].

Thereafter, the film is preferably heat-set at a temperature of [Tg+60° C.] to [Tg+120° C.] for 0.2 to 20 seconds. By maintaining the heat setting temperature and time within the above ranges, there can be obtained a film having excellent delamination resistance and curling resistance as well as high transparency.

The thickness of the biaxially oriented film of the present invention can be suitably selected according to the application of a photo film comprising the biaxially oriented film as a base film. It is preferably 25 to 250 μm, particularly preferably 40 to 150 μm.

Since the biaxially oriented film of the present invention is hardly curled, that is, it has curling resistance, it is suitable for use as a base film for a photo film. Stated more specifically, it must have curling resistance of 50 [$m^{-1}$] or less at 80° C. in terms of ANSI curl value. This temperature value of 80° C. is an approximate value of the highest temperature to which a photo film may possibly be exposed in its daily use. When the ANSI curl value is larger than 50 [$m^{-1}$], it is difficult to handle the film in the development step of a photo film disadvantageously.

Conventionally, the curling resistance of a photo film has been evaluated based on how much curling is removed after the development or drying step of a general photo film. When a base film for a photo film has the above ANSI curl value, it is hardly curled, that is, it has excellent curing resistance, and it is also excellent in curling resistance that a curl formed once is easily removed.

The biaxially oriented film of the present invention also has excellent delamination resistance.

The delamination resistance is expressed by using fold line whitening ratio as an index. The fold line whitening ratio as used in the present invention is defined as a proportion of the total length of whitened portions produced by folding a film to the total length of a folded portion of the film.

The film of the present invention must have a delamination resistance of 10% or less in terms of fold line whitening ratio. When the delamination resistance is 10% or less, the occurrence of a whitening phenomenon which occurs, for example, at the time of perforating as a base film for a photo film can be reduced low. The fold line whitening ratio is preferably 8% or less.

The biaxially oriented film of the present invention has Young's moduli in both longitudinal and transverse directions of 550 kg/$mm^2$ or more, preferably 600 kg/$mm^2$ or more, which shows that it has excellent strength.

Effect of the Invention

Since the biaxially oriented film made of the polyethylene naphthalate copolymer of the present invention is excellent in delamination resistance, curling resistance, mechanical strength, color and transparency, it can be advantageously used as a base film for a photo film in a wide range of photographic application such as photo films, roll films for still pictures, roll films for movie pictures, roll films for X-ray pictures, films for photoengraving, and the like.

EXAMPLES

The following examples are given to further illustrate the present invention. In the examples, characteristic property values were measured in accordance with the following methods. In the examples, "parts" means "parts by weight", and diethylene glycol may sometimes be abbreviated as DEG. The 263-70 model of Hitachi, Ltd. was used for gas chromatography and the R-1900 of Hitachi, Ltd. was used for $^1$H-NMR.

(1) intrinsic viscosity

This was measured in a phenol/tetrachloroethane mixed solvent (weight ratio of 6:4) at 35° C.

(2) amount of component "a" copolymerized

The polymer was dissolved in trifluoroacetic acid deuteride, and the amount of component "a" was determined by $^1$H-NMR.

(3) content of diethylene glycol (DEG)

The polymer was decomposed using hydrazine hydrate and the content of diethylene glycol (DEG) was determined by a gas chromatography.

(4) fold line whitening ratio (delamination resistance)

A film sample was cut to a size of 80×80 mm and this sample piece was softly folded into two by hand, sandwiched between a pair of flat metal plates and pressed by a press machine at a predetermined pressure $P_1$ (kg/$cm^2$G) for 20 seconds. After pressing, the folded film sample was unfolded by hand to restore its original state, sandwiched between the above metal plates again and pressed at a pressure $P_1$ (kg/$cm^2$G) for 20 seconds. Thereafter, the film sample was taken out and the lengths of whitened portions appeared on the fold line were measured and totaled.

Using new film samples, the above measurement was repeated at a pressure $P_1$ (=1, 2, 3, 4, 5 and 6 (kg/$cm^2$G)).

The proportion (%) of the mean value of the totals of the lengths of whitened portions at respective pressures to the total length (80 mm) of the fold line is taken as fold line whitening ratio (%) and used as an index of difficulty in occurrence (delamination resistance) of interlaminar peeling (delamination) of the film.

(5) curling resistance (ANSI curl value)

A film sample measuring 120×25 mm was left to stand on a flat place at 23° C. and 50 % RH for 24 hours, wound round a roll core having a diameter of 7 mm in a longitudinal direction, fixed provisionally so as not to be unwound, heated at 80° C. for 2 hours and unwound. Thereafter, it was immersed in distilled water at 40° C. for 15 minutes, hung perpendicularly in a longitudinal direction, and heated to be dried in an air thermostatic oven at 55° C. under a load of 33.5 g for 3 minutes.

The curled sample was measured in accordance with a test method A specified in ANSI PH 1.29-1971, and its curl value was calculated by converting the length in inches into that in meters and used as an index of curling resistance.

(6) Young's moduli

A 10 mm-wide sample film was set in a tensile tester with the chuck interval of 100 mm to carry out a tensile test at 23° C. and 50 % RH at a pulling rate of 10 mm/min, and Young's moduli in a longitudinal direction (MD) and a transverse direction (TD) were measured.

Example 1

An ester interchange reaction was carried out among 100 parts of dimethyl naphthalene-2,6-dicarboxylate, 60 parts of ethylene glycol and 5.4 parts (3 mol % based on the total of all dicarboxylic acids) of 9,9-bis[4-(2-hydroxyethoxy) phenyl]fluorene in the presence of 0.03 part of manganese acetate tetrahydrate as an ester interchange catalyst in accordance with a commonly used method, and 0.023 part of trimethyl phosphate was added to substantially terminate the ester interchange reaction.

Further, 0.024 part of antimony trioxide was added, and a polycondensation reaction was carried out at a high temperature and a high vacuum in accordance with a commonly used method to give a polyethylene naphthalate copolymer having an intrinsic viscosity of 0.62 dl/g and the amount of DEG copolymerized of 1.3 mol %.

Pellets of the polyethylene naphthalate copolymer were dried at 180° C. for 3 hours, supplied to the hopper of an extruder, molten at 300° C. and extruded onto a rotary cooling drum having a surface temperature of 40° C. through a 1-mm slit die to give an unoriented film. The thus obtained unstretched film was preheated at 120° C., stretched to 3.0 times in a longitudinal direction between high-speed and low-speed rolls while heated with an IR heater at 900° C. from 15 mm above the rolls and supplied to a stenter to be stretched to 3.3 times in a transverse direction at 140° C. The obtained biaxially oriented film was heat-set at 210° C. for 5 seconds to give a 75-μm-thick polyethylene naphthalate copolymer film.

When the obtained film was heated at 110° C. for 2 days and measured for its characteristic properties, it was found that the film was suitable for use as a base film for a photo film as shown in Table 1.

Examples 2 to 4

Biaxially oriented films were obtained in the same manner as in Example 1 except that the amount of the same fluorene compound as used in Example 1 was changed as shown in Table 1. The characteristic properties of the obtained films are shown in Table 1. They were suitable for use as a base film for a photo film as was the film obtained in Example 1.

Comparative Example 1

A biaxially oriented film was obtained in the same manner as in Example 1 except that a fluorene compound was not added. The characteristic properties of the obtained film are shown in Table 1. A film which was satisfactory in terms of delamination resistance and curling resistance was not obtained.

Example 5 and Comparative Example 2

Biaxially oriented films were obtained in the same manner as in Example 1 except that the amount of the same fluorene compound as used in Example 1 was changed to 5.5 mol % (Example 5) and 10 mol % (Comparative Example 2) as shown in Table 1. The characteristic properties of the obtained films are shown in Table 1. Although both films were satisfactory in terms of delamination resistance, the film of Example 5 was slightly inferior in Young's moduli and curling resistance and the film of Comparative Example 2 was more inferior in these properties.

Comparative Examples 3 and 4

A biaxially oriented film was obtained in the same manner as in Example 1 except that 2 parts of DEG was added (Comparative Example 3). The amount of copolymerized DEG contained in the copolyester was 4.1 mol %.

A biaxially oriented film was obtained in the same manner as in Example 1 except that DEG was not added and that a polymerization reaction was carried out at atmospheric pressure for 25 minutes after antimony trioxide was added (Comparative Example 4). The amount of copolymerized DEG contained in the copolyester was 3.5 mol %. This DEG was produced as a by-product of the polymerization reaction and contained as a copolymer component.

When the amount of copolymerized DEG was larger than 3 mol %, the resulting film was unsatisfactory in terms of Young's moduli and curling resistance, even If the same fluorene compound as used in Example 1 was copolymerized.

TABLE 1

|  | amount of component "a" copolymerized (mol %) | content of DEG (mol %) | intrinsic viscosity (dl/g) | fold line whitening ratio (%) | ANSI curl value of curling resistance ($m^{-1}$) | Young's moduli MD/TD ($kg/mm^2$) |
| --- | --- | --- | --- | --- | --- | --- |
| Ex. 1 | 3.0 | 1.3 | 0.62 | 3 | 18 | 610/624 |
| Ex. 2 | 4.8 | 1.5 | 0.61 | 0 | 27 | 590/596 |
| Ex. 3 | 0.6 | 0.9 | 0.64 | 7 | 26 | 613/622 |
| Ex. 4 | 3.0 | 2.5 | 0.59 | 8 | 38 | 578/582 |
| Ex. 5 | 5.5 | 1.5 | 0.60 | 0 | 44 | 520/523 |
| Comp. Ex. 1 | 0 | 1.2 | 0.63 | 28 | 22 | 616/638 |
| Comp. Ex. 2 | 10 | 2.0 | 0.60 | 0 | 59 | 477/485 |
| Comp. Ex. 3 | 3.0 | 4.1 | 0.62 | 2 | 58 | 496/503 |
| Comp. Ex. 4 | 4.0 | 3.5 | 0.60 | 2 | 55 | 480/497 |

Ex.: Example
Comp. Ex.: Comparative Example
component "a": 9,9-bis[4-(hydroxyethoxy)phenyl]fluorene

Example 6

An ester interchange reaction was carried out among 100 parts of dimethyl naphthalene-2,6-dicarboxylate, 2.1 parts (3 mol % based on the total of all dicarboxylic acid components and a p-hydroxymethylbenzoic acid component) of methyl p-hydroxymethylbenzoate and 60 parts of ethylene glycol in the presence of 0.03 part of manganese acetate tetrahydrate as an ester interchange catalyst in accordance with a commonly used method, and 0.023 part of trimethyl phosphate was added to substantially terminate the ester interchange reaction.

Thereafter, 0.024 part of antimony trioxide was added, and a polycondensation reaction was carried out at a high temperature and a high vacuum in accordance with a commonly used method to give a polyethylene naphthalate copolymer having an intrinsic viscosity of 0.61 dl/g and an amount of copolymerized DEG of 1.2 mol %.

Pellets of the polyethylene naphthalate copolymer were dried at 180° C. for 3 hours, supplied to the hopper of an extruder, molten at 300° C. and extruded onto a rotary cooling drum having a surface temperature of 40° C. through a 1-mm slit die to give an unstretched film. The thus obtained unstretched film was preheated at 120° C., stretched to 3.0 times in a longitudinal direction between high-speed and low-speed rolls while heated with an IR heater at 900° C. from 15 mm above the rolls and supplied to a stenter to be stretched to 3.3 times in a transverse direction at 140° C. The obtained biaxially oriented film was heat-set at 210° C. for 5 seconds to give a 75-μm-thick polyethylene naphthalate copolymer film.

When the obtained film was heated at 110° C. for 2 days and measured for its characteristic properties, it was found that the film had excellent properties as a base film for a photo film as shown in Table 2.

Examples 7 to 9

Biaxially oriented films were obtained in the same manner as in Example 6 except that the amount of methyl p-hydroxymethylbenzoate was changed as shown in Table 2. The characteristic properties of the obtained films are shown in Table 2. They had excellent properties as a base film for a photo film as did the film obtained in Example 6.

Comparative Examples 5 and 6

Biaxially oriented films were obtained in the same manner as in Example 6 except that the amount of methyl p-hydroxymethylbenzoate was changed to the amount larger than 10 mol %, as shown in Table 2. The characteristic properties of the obtained films are shown in Table 2. The films were satisfactory in terms of delamination resistance but unsatisfactory in terms of Young's moduli and curling resistance.

The characteristic properties of the film obtained from a polyester (Comparative Example 1) when methyl p-hydroxymethylbenzoate was not added are shown in Table 2 for reference.

Comparative Example 7

A biaxially oriented film was obtained in the same manner as in Example 6 except that 2 parts of DEG was added. The amount of copolymerized DEG contained in the copolyester was 4.3 mol %.

When the amount of copolymerized DEG was larger than 3 mol %, the obtained film was unsatisfactory in terms of Young's moduli and curling resistance, even if the same amount of the p-hydroxymethylbenzoic acid component as used in Example 6 was copolymerized.

methyl p-hydroxyethoxyethoxybenzoate and 60 parts of ethylene glycol in the presence of 0.03 part of manganese acetate tetrahydrate as an ester interchange catalyst in accordance with a commonly used method, and 0.023 part of trimethyl phosphate was added to substantially terminate the ester interchange reaction.

Thereafter, 0.024 part of antimony trioxide was added, and a polycondensation reaction was carried out at a high temperature and a high vacuum in accordance with a commonly used method to give a polyethylene naphthalate copolymer having an intrinsic viscosity of 0.61 dl/g and an amount of copolymerized DEG of 1.2 mol %.

Pellets of the polyethylene naphthalate copolymer were dried at 180° C. for 3 hours, supplied to the hopper of an extruder, molten at 300° C. and extruded onto a rotary cooling drum having a surface temperature of 40° C. through a 1-mm slit die to give an unstretched film. The thus obtained unstretched film was preheated at 120° C., stretched to 3.0 times in a longitudinal direction between high-speed and low-speed rolls while heated with an IR heater at 900° C. from 15 mm above the rolls and supplied to a stenter to be stretched to 3.3 times in a transverse direction at 140° C. The obtained biaxially oriented film was heat-set at 210° C. for 5 seconds to give a 75-μm-thick polyethylene naphthalate copolymer film.

When the obtained film was heated at 110° C. for 2 days and measured for its characteristic properties, it was found that the film had excellent properties as a base film for a photo film as shown in Table 3.

Examples 11 to 13

Biaxially oriented films were obtained in the same manner as in Example 1 except that the amount of methyl p-hydroxyethoxyethoxybenzoate was changed as shown in Table 3. The characteristic properties of the obtained films are shown in Table 3. The films had excellent properties as a base film for a photo film as did the film obtained in Example 1.

Comparative Example 1

The characteristic properties of the film obtained from a polyester (Comparative Example 1) when methyl

TABLE 2

|  | amount of MHB copolymerized (mol %) | content of DEG (mol %) | intrinsic viscosity | fold line whitening ratio (%) | ANSI curl value of curling resistance (m$^{-1}$) | Young's moduli MD/TD (kg/mm$^2$) |
| --- | --- | --- | --- | --- | --- | --- |
| Ex. 6 | 3 | 1.2 | 0.61 | 3 | 29 | 590/605 |
| Ex. 7 | 5 | 1.3 | 0.62 | 1 | 33 | 560/577 |
| Ex. 8 | 7 | 1.3 | 0.62 | 0 | 39 | 540/558 |
| Ex. 9 | 1.5 | 1.2 | 0.61 | 5 | 24 | 603/621 |
| Comp. Ex. 1 | 0 | 1.2 | 0.63 | 28 | 22 | 616/638 |
| Comp. Ex. 5 | 12 | 1.5 | 0.62 | 0 | 61 | 478/490 |
| Comp. Ex. 6 | 15 | 1.5 | 0.61 | 0 | 66 | 463/479 |
| Comp. Ex. 7 | 3 | 4.3 | 0.63 | 0 | 59 | 488/501 |

Ex.: Example
Comp. Ex.: Comparative Example
MHB: methyl p-hydroxymethylbenzoate
DEG: diethylene glycol Example 10

An ester interchange reaction was carried out among 100 parts of dimethyl naphthalene-2,6-dicarboxylate, 2.1 parts (3 mol % based on the total of all dicarboxylic acid components and a p-hydroxyethoxyethoxybenzoic acid component) of p-hydroxyethoxyethoxybenzoate was not added are shown in Table 3 for reference.

Comparative Examples 8 and 9

Biaxially oriented films wee obtained in the same manner as in Example 10 except that the amount of methyl p-hydroxyethoxyethoxybenzoate was changed to the amount larger than 10 mol % as shown in Table 3. The characteristic properties of the obtained films are shown in Table 3. The films were satisfactory in terms of delamination resistance but unsatisfactory in terms of Young's moduli and curling resistance.

Comparative Example 10

A biaxially oriented film was obtained in the same manner as in Example 10 except that 2 parts of DEG was added. The amount of copolymerized DEG contained in the copolyester was 4.3 mol %. The characteristic properties of the obtained film are shown in Table 3.

When the amount of copolymerized DEG was larger than 3 mol %, the obtained film was unsatisfactory in terms of Young's moduli and curling resistance, even if the same amount of the p-hydroxyethoxyethoxybenzoic acid component as used in Example 10 was copolymerized.

heat-set at 210° C. for 5 seconds to give a 75-µm-thick polyethylene naphthalate copolymer film.

When the obtained film was heated at 110° C. for 2 days and measured for its characteristic properties, it was found that the film had excellent properties as a base film for a photo film as shown in Table 4.

Examples 15 to 17

Biaxially oriented films were obtained in the same manner as in Example 14 except that the amount of methyl p-hydroxyethoxybenzoate was changed as shown in Table 4. The characteristic properties of the obtained films are shown in Table 4. The films had excellent properties as a base film for a photo film as did the film obtained in Example 14.

Comparative Example 1

The characteristic properties of the film obtained from a polyester (Comparative Example 1) when methyl

TABLE 3

|  | amount of copolymerized MEEB (mol %) | content of DEG (mol %) | intrinsic viscosity | fold line whitening ratio (%) | ANSI curl value of curling resistance (m$^{-1}$) | Young's moduli MD/TD (kg/mm$^2$) |
|---|---|---|---|---|---|---|
| Ex. 10 | 3 | 1.3 | 0.60 | 2 | 30 | 595/610 |
| Ex. 11 | 5 | 1.4 | 0.62 | 1 | 37 | 575/584 |
| Ex. 12 | 7 | 1.3 | 0.62 | 0 | 42 | 550/570 |
| Ex. 13 | 1.5 | 1.2 | 0.62 | 4 | 26 | 610/629 |
| Comp. Ex. 1 | 0 | 1.3 | 0.63 | 30 | 22 | 616/638 |
| Comp. Ex. 8 | 12 | 1.6 | 0.61 | 0 | 65 | 480/495 |
| Comp. Ex. 9 | 15 | 1.4 | 0.64 | 0 | 70 | 468/482 |
| Comp. Ex. 10 | 3 | 4.2 | 0.63 | 0 | 63 | 491/508 |

Ex.: Example
Comp. Ex.: Comparative Example
MEEB: methyl p-hydroxyethoxyethoxybenzoate
DEG: diethylene glycol Example 14

An ester interchange reaction was carried out among 100 parts of dimethyl naphthalene-2,6-dicarboxylate, 1.7 arts (3 mol % based on the total of all dicarboxylic acid components and a p-hydroxyethoxybenzoic acid component) of methyl p-hydroxyethoxybenzoate and 60 parts of ethylene glycol in the presence of 0.03 part of manganese acetate tetrahydrate as an ester interchange catalyst in accordance with a commonly used method, and 0.023 part of trimethyl phosphate was added to substantially terminate the ester interchange reaction.

Thereafter, 0.024 part of antimony trioxide was added, and a polycondensation reaction was carried out at a high temperature and a high vacuum in accordance with a commonly used method to give a polyethylene naphthalate copolymer having an intrinsic viscosity of 0.63 dl/g and an amount of copolymerized DEG or 1.3 mol %.

Pellets of the polyethylene naphthalate copolymer were dried at 180° C. for 3 hours, supplied to the hopper of an extruder, molten at 300° C. and extruded onto a rotary cooling drum having a surface temperature of 40° C. through a 1-mm slit die to give an unstretched film. The thus obtained unstretched film was preheated at 120° C., stretched to 3.0 times in a longitudinal direction between high-speed and low-speed rolls while heated with an IR heater at 900° C. from 15 mm above the rolls and supplied to a stenter to be stretched to 3.3 times in a transverse direction at 140° C. The obtained biaxially oriented film was p-hydroxyethoxybenzoate was not added are shown in Table 4 for reference.

Comparative Example 11

A biaxially oriented film was obtained in the same manner as in Example 14 except that the amount of methyl p-hydroxyethoxybenzoate was changed to the amount larger than 10 mol % as shown in Table 4. The characteristic properties of the obtained film are shown in Table 4. The film was satisfactory in terms of delamination resistance but unsatisfactory in terms of Young's moduli and curling resistance.

Comparative Example 12

A biaxially oriented film was obtained in the same manner as in Example 14 except that 2 parts of DEG was added. The amount of copolymerized DEG contained in the copolyester was 4.3 mol %.

When the amount of copolymerized DEG was larger than 3 mol %, the obtained film was unsatisfactory in terms of Young's moduli and curling resistance, even if the same amount of a p-hydroxyethoxybenzoic acid component as used in Example 14 was copolymerized.

TABLE 4

|  | amount of MEB copolymerized (mol %) | content of DEG (mol %) | intrinsic viscosity | fold line whitening ratio (%) | ANSI curl value of curling resistance ($m^{-1}$) | Young's moduli MD/TD ($kg/mm^2$) |
| --- | --- | --- | --- | --- | --- | --- |
| Ex. 14 | 3 | 1.3 | 0.63 | 2 | 28 | 590/610 |
| Ex. 15 | 5 | 1.3 | 0.64 | 2 | 35 | 580/596 |
| Ex. 16 | 7 | 1.4 | 0.62 | 1 | 40 | 561/580 |
| Ex. 17 | 1.5 | 1.2 | 0.61 | 5 | 24 | 604/625 |
| Comp. Ex. 1 | 0 | 1.2 | 0.63 | 28 | 22 | 616/638 |
| Comp. Ex. 11 | 12 | 1.5 | 0.63 | 0 | 62 | 470/492 |
| Comp. Ex. 12 | 3 | 4.3 | 0.64 | 0 | 60 | 493/516 |

Ex.: Example
Comp. Ex.: Comparative Example
MEB: methyl p-hydroxyethoxybenzoate
DEG: diethylene glycol

We claim:

1. A biaxially oriented film which is made substantially of
   (1) a polyethylene naphthalate copolymer comprising ethylene naphthalate unit in an amount of 92 to 99.5 mol % based on all recurring units and at least one copolymer component selected from the group consisting of (a) a glycol having a fluorene skeleton in the molecule, (b) p-hydroxymethylbenzoic acid, (c) p-hydroxyethoxybenzoic acid and (d) p-hydroxyethoxybenzoic acid in an amount of 0.5 to 8 mol % based on the total of all dicarboxylic acid components, said polyethylene naphthalate copolymer comprising a diethylene glycol component in an amount of 3 mol % or less based on the total of all dicarboxylic acid components and which has
   (2) Young's moduli in both longitudinal and transverse directions of 500 kg/mm² or more and (3) a delamination resistance of 10% or less in terms of fold line whitening ratio.

2. The biaxially oriented film of claim 1, which has a curling resistance of 50 [$m^{-1}$] or less in terms of ANSI curl value.

3. The biaxially oriented film of claim 1, which has Young's moduli in both longitudinal and transverse directions of 550 kg/mm² or more.

4. The biaxially oriented film of claim 1, which has a delamination resistance of 8% or less in terms of fold line whitening ratio.

5. The biaxially oriented film of claim 1, which has a curling resistance of 45 [$m^{-1}$] or less in terms of ANSI curl value.

6. The biaxially oriented film of claim 1, wherein the ethylene naphthalate unit is an ethylene-2,6-naphthalate unit.

7. The biaxially oriented film of claim 1, wherein the copolymer component is (a) the glycol having a fluorene skeleton in an amount of 0.5 to 5 mol % based on the total of all dicarboxylic acid components.

8. The biaxially oriented film of claim 1, wherein the copolymer component is (b) the p-hydroxymethylbenzoic acid in an amount of 1 to 8 mol % based on the total of all dicarboxylic acid components.

9. The biaxially oriented film of claim 1, wherein the copolymer component is (c) the p-hydroxyethoxybenzoic acid in an amount of 1 to 8 mol % based on the total of all dicarboxylic acid components.

10. The biaxially oriented film of claim 1, wherein the copolymer component is (d) the p-hydroxyethoxyethoxybenzoic acid in an amount of 1 to 8 mol % based on the total of all dicarboxylic acid components.

11. A photo film comprising the biaxially oriented film of claim 1 as a base film.

12. A magnetic recording medium comprising the biaxially oriented film of claim 1 as a base film.

* * * * *